May 5, 1925.
S. A. CRONE
CAR TRUCK BRAKE BEAM MECHANISM
Filed Aug. 2, 1924
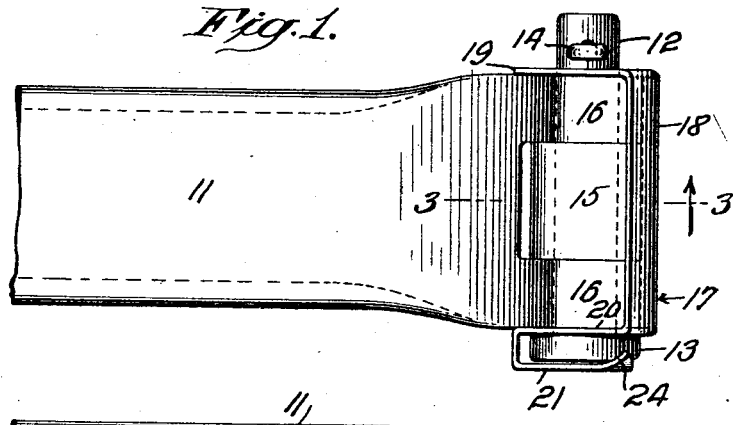
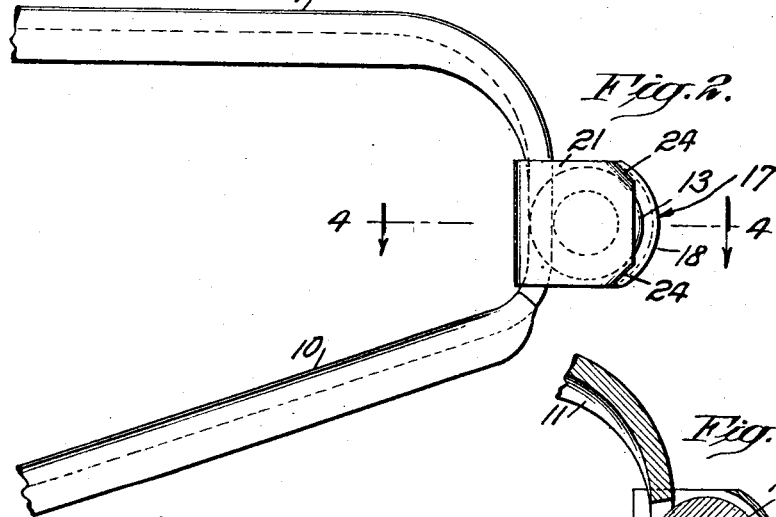
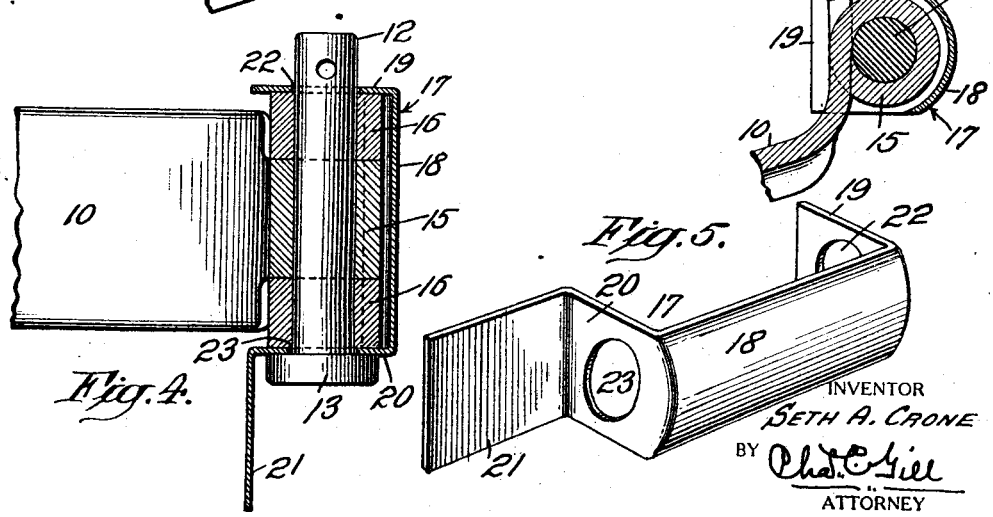
INVENTOR
SETH A. CRONE
BY
ATTORNEY Patented May 5, 1925.

1,536,567

UNITED STATES PATENT OFFICE.

SETH A. CRONE, OF EAST ORANGE, NEW JERSEY.

CAR-TRUCK BRAKE-BEAM MECHANISM.

Application filed August 2, 1924. Serial No. 729,692.

*To all whom it may concern:*

Be it known that I, SETH A. CRONE, a citizen of the United States, and resident of East Orange, in the county of Essex and State of New Jersey, have invented certain new and useful Improvements in Car-Truck Brake-Beam Mechanisms, of which the following is a specification.

The invention pertains more particularly to a pin-retaining device capable of use on hinge-joints or where two members having hinge-knuckles on their ends are brought together and secured by a pin or pintle having on one end a head and at its other end a cotter key, the cotter key being, heretofore, depended on to prevent the loss of the pin.

My invention does not modify the parts forming the joint, the pin or the cotter key but comprises a locking device of simple nature applied to the end portions of the pin and exteriorly bridging over all the hinge members and adapted to retain the pin in place in the event that the cotter key should become lost therefrom.

The invention has been designed more especially for application to the outer meeting ends of inclined carrier or brake-beam suspension bars and overhead guard bars, the brake-beam being held captive between the carrier and guard bars and both bars being secured at their inner portions to a car-truck. The outer end of the carrier bar is formed with an upwardly and outwardly projecting central sleeve or knuckle, and the outer end of the guard bar is formed at opposite sides of its longitudinal center with downwardly and outwardly projecting sleeves or knuckles which straddle and pass into alignment with the knuckle on the carrier bar, and a pin is passed through the knuckles or hinge members and secured by a cotter key. The pin is horizontal and if the cotter key should become broken or lost the jarring of the truck will cause the displacement and loss of the pin, to avoid which result is the prime object of my invention.

A complete example of the carrier or suspension bars and guard bars to which I have hereinbefore referred, is shown and described in my application for Letters Patent filed March 22, 1924, Serial No. 701,009.

The invention will be fully understood from the detailed description hereinafter presented, reference being had to the accompanying drawings, in which:

Fig. 1 is a top view, partly broken away, of the outer end portion of a carrier or four-point suspension bar and overhead guard bar, the outer ends of said bars being of hinge formation and connected together by a pin, the latter being secured against loss by the retaining device of my invention;

Fig. 2 is a side elevation of the same;

Fig. 3 is a vertical longitudinal section through a portion of the same, taken on the dotted line 3—3 of Fig. 1;

Fig. 4 is a horizontal longitudinal section, through a portion of the same, taken on the dotted line 4—4 of Fig. 1 and illustrates the manner of assembling the aforesaid bars, pin and retaining device, and Fig. 5 is a detached perspective view of the retaining device of my invention, shown in its initial form ready for application to use.

In the drawings, 10 designates the carrier or suspension bar and 11 the guard bar whose inner portions are secured to the car truck, not shown, and whose outer ends are brought together and secured by a pin 12 having on one end a head 13 and on its other end being equipped with a cotter key 14.

The outer end of the carrier bar 10 turns upwardly and is formed on a narrowed end part thereof with a central horizontal sleeve or knuckle 15 which projects outwardly and is horizontally disposed. The outer end of the guard bar 11 turns downwardly and is formed with two side sleeves or knuckles 16 which project outwardly and receive between them the knuckle 15. These outwardly projecting sleeves or knuckles 15, 16 may, for convenience, be termed hinge members, and they receive the pin 12, which is removable and serves to detachably connect the outer ends of the bars 10 and 11 together.

The pin retaining device is numbered, as a whole, 17 and is preferably in one piece of sheet steel and comprises a body portion 18, parallel end members 19, 20, respectively, extending from and at right angles to said body portion and an extension member 21, which initially projects outwardly from the free end of the end member 20 and stands at a right angle to said member. The end members 19, 20 contain corresponding apertures 22, 23, respectively, through which the pin 12 passes. The body portion 18 of the retainer 17 is preferably curved or of arc shape in cross section so as to snugly fit around and house the outer portions of the hinge members 15, 16, and said body portion is of sufficient length to extend transversely entirely across said members.

After the outer ends of the bars 10, 11 are brought together with their hinge members 15, 16 in alignment, the retainer 17 is applied to said members with its apertures 22, 23 in line with the openings through said members, and thereupon the pin 12 is inserted through the aperture 23, the hinge members 15, 16 and the aperture 22, as shown in Fig. 4, after which the cotter key 14 is applied to the outer end of said pin, the pin then securing the outer ends of the bars 10, 11 together and fastening the retainer 17 on said ends. In order to prevent the loss of the pin 12 in the event that the cotter key 14 should become broken or detached, the extension member 21 is bent over outwardly against the head 13 of said pin for the purpose of locking the pin against loss or accidental displacement. The free end of the extension member 21, at its corner edges, extends, when said extension member is folded against the head 13, slightly beyond adjacent edges of said head and this portion of said member is hammered or flanged inwardly against the side of the head, as at 24, so as to leave no portion of the member 21, projecting outwardly beyond said head in a manner to be struck by some object which might straighten out the member 21 and render the retainer inoperative.

The retaining device 17 is simple in construction and may be readily applied to position and when in position is entirely efficient in preventing the accidental loss or displacement of the pin 12. The retaining device houses a substantial portion of the hinge members 15, 16, due to their projection and the length and cross sectional shape of the body part 18 of the retainer. The flanging, at 24, of portions of the free end of the extension-member 21 serves to guard against the accidental straightening out of said member, thus increasing the security of the retainer.

I have hereinbefore described a particular construction of my pin-retaining device in combination with specially formed jointed ends of brake-beam suspension-bars and overhead guard bars and while I have found this special employment and relationship of the device to be of particular advantage in the construction described, I do not limit my invention in every instance to the combination described, since I have found the pin-retaining device to be of advantage in connection with other parts of the said guard bars distant from their outer ends.

What I claim as my invention and desire to secure by Letters Patent, is:

1. In car-truck brake-beam mechanism, a brake-beam suspension bar, an overhead guard bar, said bars at their outer ends being formed with matching transverse sleeves, a transverse pin extending through said sleeves for securing said ends together, said pin having a head on one end and equipped with a cotter key at the other end, and a retaining device for said pin, said device comprising a body portion bridging said sleeves, an apertured end member on the device between said cotter key and the adjacent sleeve, an apertured end member on said device between the head of the pin and the sleeve adjacent thereto and an extension member extending from the last mentioned end member and bent over against the outer face of said head.

2. In car-truck brake-beam mechanism, a brake-beam suspension bar, an overhead guard bar, said bars at their outer ends being formed with matching transverse sleeves, a transverse pin extending through said sleeves for securing said ends together, said pin having a head on one end and equipped with a cotter key at the other end, and a retaining device for said pin, said device comprising a body portion bridging said sleeves, an apertured end member on the device between said cotter key and the adjacent sleeve, an apertured end member on said device between the head of the pin and the sleeve adjacent thereto and an extension member extending from the last mentioned end member and bent over against the outer face of said head and at its free end being flanged inwardly against the side of said head.

3. In car-truck brake-beam mechanism, a brake-beam suspension bar, an overhead guard bar, said bars at their outer ends being formed with outwardly projecting matching transverse sleeves, a transverse pin extending through said sleeves for securing said ends together, said pin having a head on one end and equipped with a cotter key at the other end, and a retaining device for said pin, said device comprising a body portion bridging said sleeves, an apertured end member on the device between said cotter key and the adjacent sleeve, an apertured end member on said device between the head of the pin and the sleeve adjacent thereto and an extension member extending from the last mentioned end member and bent over against the outer face of said head.

4. In car-truck brake-beam mechanism, a brake-beam suspension bar, an overhead guard bar, said bars at their outer ends being formed with outwardly projecting matching transverse sleeves, a transverse pin extending through said sleeves for securing said ends together, said pin having a head on one end and equipped with a cotter key at the other end, and a retaining device for said pin, said device comprising a body portion bridging said sleeves, an apertured end member on the device between said cotter key and the adjacent sleeve, an apertured end member on said device between the head of the pin and the sleeve adjacent thereto and an extension member extending from the last mentioned end member and bent over against the outer face of said head, said body portion being of arc outline and housing the outer portions of said sleeves.

5. In car-truck brake-beam mechanism comprising a plurality of parallel members, a horizontal pin extending through said members having on one end a head and equipped with a cotter key at the other end, and a retaining device for said pin comprising in one piece a horizontal body portion bridging all of said members, an apertured end part on said device between said cotter key and the adjacent one of said members, an apertured end part on said device between the head of the pin and the member adjacent thereto and an extension part extending from the last mentioned end part and bent over against the outer face of said head.

6. In car-truck brake-beam mechanism comprising a plurality of parallel members, a horizontal pin extending through said members having on one end a head and equipped with a cotter key at the other end, and a retaining device for said pin comprising in one piece a horizontal boly portion bridging all of said members, an apertured end part on said device between said cotter key and the adjacent one of said members, an apertured end part on said device between the head of the pin and the member adjacent thereto and an extension part extending from the last mentioned end part and bent over against the outer face of said head and at its free end being flanged inwardly against the side of said head.

Signed at New York city, in the county of New York and State of New York, this 31st day of July A. D. 1924.

SETH A. CRONE.